United States Patent [19]
Béchade

[11] Patent Number: 5,511,016
[45] Date of Patent: Apr. 23, 1996

[54] METHOD FOR STORE ROUNDING AND CIRCUIT THEREFOR

[75] Inventor: Roland A. Béchade, South Burlington, Vt.

[73] Assignee: International Business Machines Corporation, Armonk, N.Y.

[21] Appl. No.: 346,968

[22] Filed: Nov. 30, 1994

[51] Int. Cl.⁶ .................................................. G06F 7/38
[52] U.S. Cl. ............................................ 364/745; 364/748
[58] Field of Search .................................. 364/745, 748, 364/715.03, 715.04, 761, 787, 788

[56] References Cited

U.S. PATENT DOCUMENTS

| | | | |
|---|---|---|---|
| 4,338,675 | 7/1982 | Palmer et al. | 364/748 |
| 4,562,553 | 12/1985 | Matterdi et al. | 364/745 |
| 4,758,972 | 7/1988 | Frazier | 364/745 |
| 4,839,846 | 6/1989 | Hirose et al. | 364/748 |
| 4,941,120 | 7/1990 | Brown et al. | 364/748 |
| 5,235,533 | 8/1993 | Sweedler | 364/715.03 |
| 5,257,215 | 10/1993 | Poon | 364/745 |
| 5,258,943 | 11/1993 | Gamez et al. | 364/745 |
| 5,404,324 | 4/1995 | Colon-Bonet | 364/761 |
| 5,408,426 | 4/1995 | Takewa et al. | 364/748 |

Primary Examiner—Paul P. Gordon
Assistant Examiner—Emmanuel L. Moise
Attorney, Agent, or Firm—Susan M. Murray

[57] ABSTRACT

A method and circuit for store rounding a number wherein the guard bit and least significant bit of the number are selectively exchanged depending on the IEEE rounding mode to simplify the decision-making circuit. Zero detection logic is performed on the guard, round and sticky bit positions to determine if incrementing is required. An incrementer provided with the number and a guard bit, which may be the true guard bit or a predetermined constant value depending on the rounding mode, responds to the zero detection logic to increment the number from the guard bit position.

14 Claims, 6 Drawing Sheets

|    | L | G | R | S | ROUND TO NEAREST | ROUND TO+∞ (SIGN BIT POSITIVE) / ROUND TO-∞ (SIGN BIT NEGATIVE) | ROUND TO-∞ (SIGN BIT POSITIVE) / ROUND TO+∞ (SIGN BIT NEGATIVE) | ROUND TO ZERO |
|----|---|---|---|---|------|------|----|----|
| 01 | 1 | 1 | 1 | 1 | +1/2LSB | +1LSB | +0 | +0 |
| 02 | 1 | 1 | 1 | 0 | +1/2LSB | +1LSB | +0 | +0 |
| 03 | 1 | 1 | 0 | 1 | +1/2LSB | +1LSB | +0 | +0 |
| 04 | 1 | 1 | 0 | 0 | +1/2LSB | +1LSB | +0 | +0 |
| 05 | 1 | 0 | 1 | 1 | +0 | +1LSB | +0 | +0 |
| 06 | 1 | 0 | 1 | 0 | +0 | +1LSB | +0 | +0 |
| 07 | 1 | 0 | 0 | 1 | +0 | +1LSB | +0 | +0 |
| 08 | 1 | 0 | 0 | 0 | +0 | +0 | +0 | +0 |
| 09 | 0 | 1 | 1 | 1 | +1/2LSB | +1LSB | +0 | +0 |
| 10 | 0 | 1 | 1 | 0 | +1/2LSB | +1LSB | +0 | +0 |
| 11 | 0 | 1 | 0 | 1 | +1/2LSB | +1LSB | +0 | +0 |
| 12 | 0 | 1 | 0 | 0 | +0 | +1LSB | +0 | +0 |
| 13 | 0 | 0 | 1 | 1 | +0 | +1LSB | +0 | +0 |
| 14 | 0 | 0 | 1 | 0 | +0 | +1LSB | +0 | +0 |
| 15 | 0 | 0 | 0 | 1 | +0 | +1LSB | +0 | +0 |
| 16 | 0 | 0 | 0 | 0 | +0 | +0 | +0 | +0 |

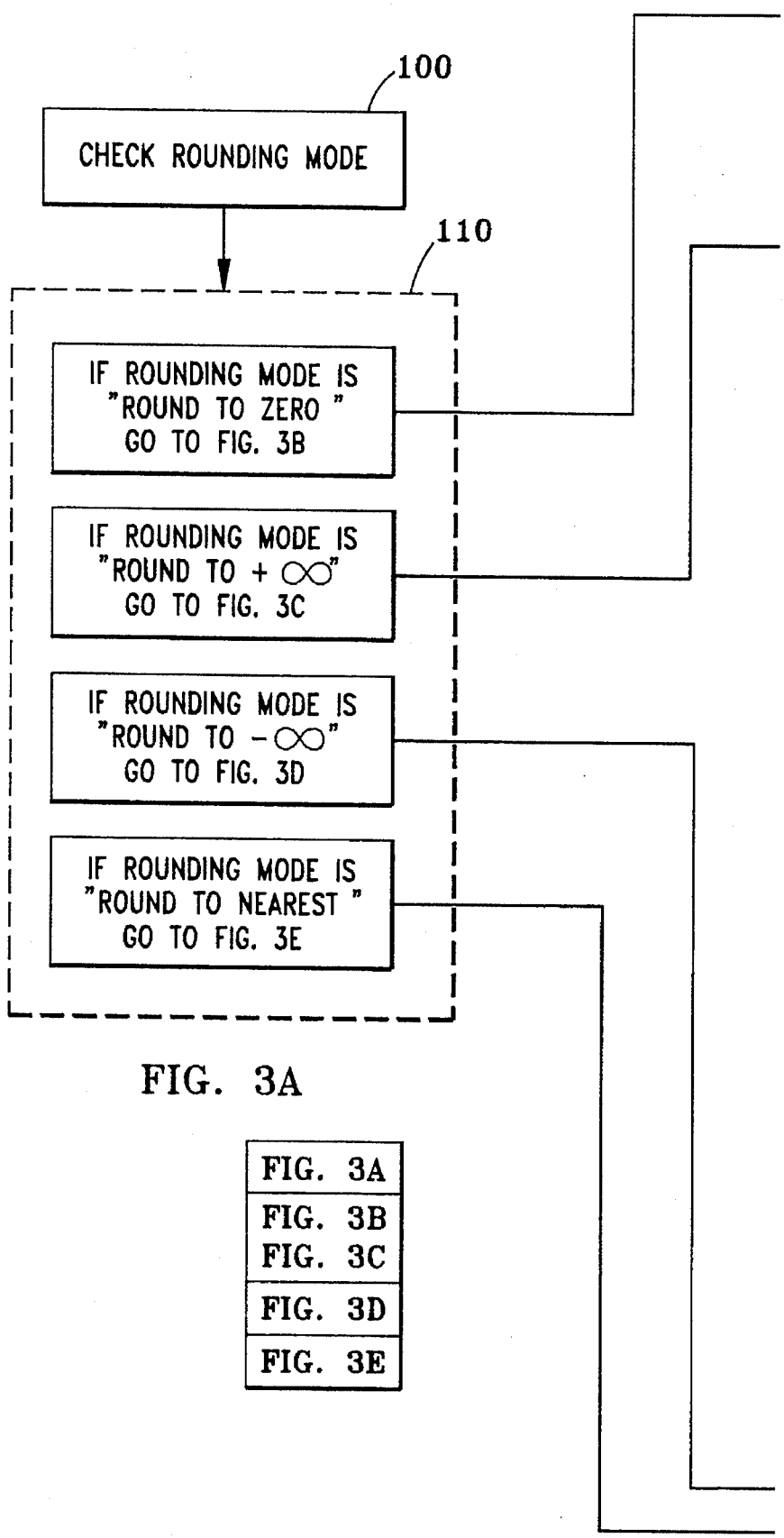

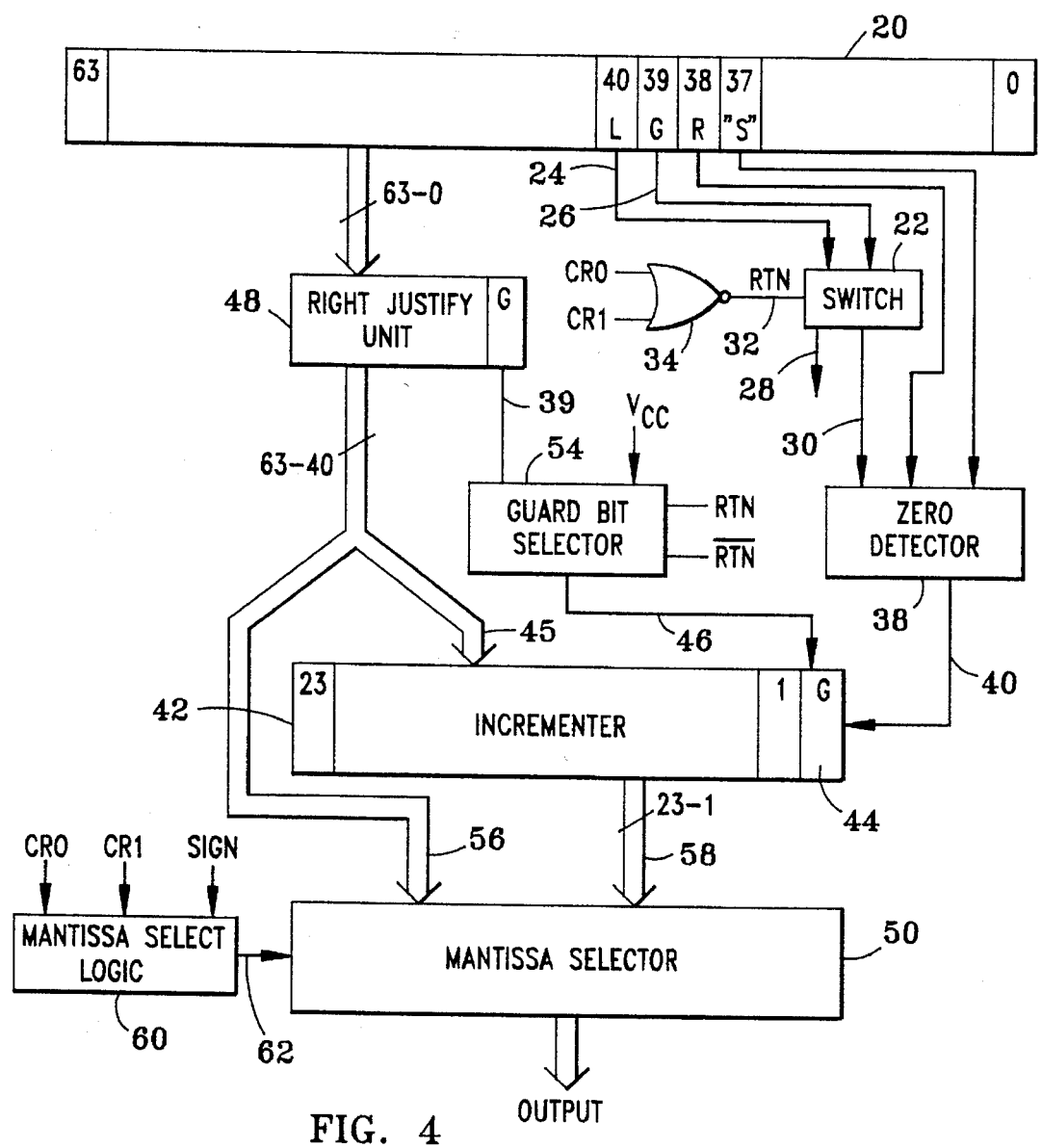
FIG. 4
FIG. 5A
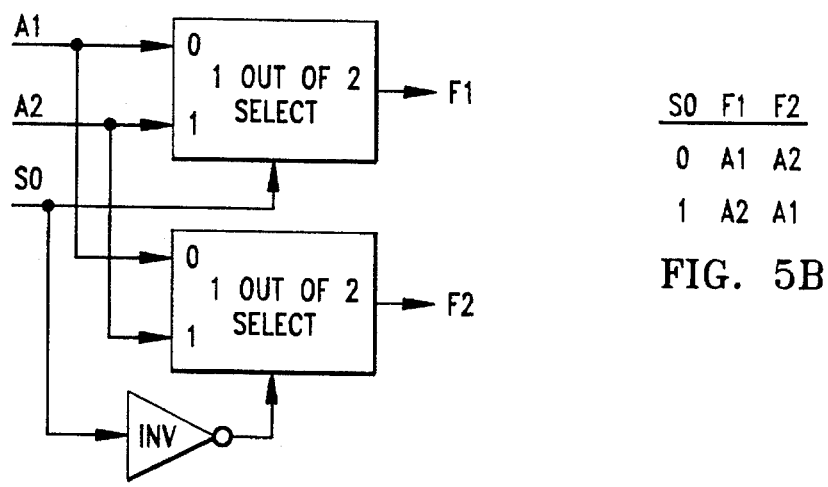
| S0 | F1 | F2 |
|----|----|----|
| 0 | A1 | A2 |
| 1 | A2 | A1 |
FIG. 5B

METHOD FOR STORE ROUNDING AND CIRCUIT THEREFOR

FIELD OF THE INVENTION

The present invention relates generally to data processing systems and more particularly to an apparatus for store rounding in a processor which performs floating point arithmetic.

BACKGROUND OF THE INVENTION

Floating point units (FPU) in processors represent numbers by a mantissa, the fractional portion of the number, an exponent (or characteristic) and a sign bit indicative of whether the number is positive or negative. Within a floating point unit the mantissa may be represented in a variety of precision formats adopted by the Institute of Electrical and Electronic Engineers (IEEE) Standard 754, including single precision (23 bits), double precision (52 bits), extended real precision (64 bits), or in an internal precision format.

Rounding is necessary during and/or after performing floating point mathematical operations for several reasons. One reason is that certain mathematical operations produce results which exceed the processors's word length. For example, in an n-bit processor, multiplication of two n-bit numbers may result in a 2n-bit product. Rounding within the floating point unit (internal rounding) is used to drop the excess bits with a minimal loss of accuracy to intermediate results. Another reason for rounding is that memory is often assigned a less precise format than the floating point unit in order to conserve space. When storing the data to memory, the data must be converted from the more precise format of the floating point unit to the less precise format of memory. This conversion requires rounding (store rounding or external rounding).

Rounding may be performed according to several known modes established by IEEE Standard 754. Rounding action dictated by each of the modes, "Round to Nearest", "Round to +∞", "Round to −∞" and "Round to Zero", depends upon the values of the least significant bit (LSB) and the three bits immediately below it designated as the guard bit (G), the round bit (R) and the sticky bit (S). The guard bit is the bit immediately below the least significant bit. The round bit is the bit immediately below the guard bit. The sticky bit is the logical OR of all bits below the round bit. For the "Round to +∞" and "Round to −∞" rounding modes the sign bit is also considered as further explained below. FIG. 1 details, according to the IEEE standard, the rounding action taken for each rounding mode.

Conventional methods of rounding require complicated random logic. This approach can be slow because of the number of delay stages required by the logic. Various prior art methods have been proposed to avoid or minimize the delays imposed by the decision-making circuitry. These methods generally involve skipping rounding or combining it with other steps. For example, U.S. Pat. No. 4,839,846, to Hirose, entitled "Apparatus for Performing Floating Point Arithmetic Operations and Rounding the Result Thereof", shows representative conventional random logic and teaches a floating point unit which combines the steps of rounding, normalization and overflow processing due to rounding. U.S. Pat. No. 4,562,553 to Mattedi, entitled "Floating Point Arithmetic System and Method with Rounding Anticipation", discloses a floating point system that includes a rounding circuit responsive to a carry circuit which anticipates whether rounding will be necessary; the rounding and arithmetic operation occur simultaneously. U.S. Pat. No. 4,941,120 to Brown, entitled "Floating Point Normalization and Rounding Prediction Circuit", discloses a rounding circuit that predicts when postnormalization and rounding can be skipped in order to enhance the efficiency of the floating point operations. Each of these prior art references relates primarily to internal rounding. In order to maintain the accuracy of the FPU, these prior art methods must maintain the integrity of the guard, round and sticky bits for further arithmetic operations.

U.S. Pat. No. 5,235,533 to Sweedler, entitled "Store Rounding in Floating Point Unit", which is incorporated by reference, discloses a normalization apparatus for converting to single precision or double precision an extended precision number comprised of a sign field, an exponent field and a mantissa field. The apparatus makes general reference to rounding logic, but does not disclose the operation of the rounding logic.

In pipelined processors each instruction is executed in part at each of a succession of stages. After the instruction has been processed at each of the stages, the execution is complete. This pipelining scheme permits multiple instructions to be performed in parallel, increasing the overall performance of the processor. Consistent with this scheme, it is desirable to perform floating point arithmetic operations simultaneously with stores to memory. More particularly, it is desirable to perform internal rounding within the floating point unit simultaneously with store rounding to memory outside the floating point unit. When storing to memory, speed is more important than maintaining the integrity of the guard, round and sticky bits, since these bits are usually not saved in memory. What is needed is a fast and efficient rounding circuit for store rounding.

PURPOSES OF THE INVENTION

It is a purpose of the present invention to provide a method and circuit for efficiently rounding numbers.

It is a further purpose of the present invention to provide a method and circuit for rounding numbers consistently with IEEE Standard 754.

It is a further purpose of the present invention to provide a method and circuit of store rounding numbers.

SUMMARY OF THE INVENTION

In one aspect of the invention a method for rounding is disclosed. According to the method of the invention a mantissa is rounded for conversion from a higher precision format to a lower precision format for store rounding. A rounding mode is selected. If the rounding mode is other than "Round to Nearest", zero detection is performed on rounding action bits of the mantissa. If the rounding mode is "Round to Nearest", one of the rounding action bits is exchanged with the least significant bit and zero detection is performed on the least significant and the other rounding action bits of the mantissa. In parallel with the zero detection if the rounding mode is other than "Round to Nearest" one of the rounding action bits of the mantissa is preset to a predetermined value; otherwise it retains its original value. If zero detection indicates all zeroes, the mantissa is not incremented; otherwise the mantissa is incremented from the position of one of the rounding action bits.

In another aspect of the invention a circuit for the method of rounding has an input storage means for receiving the mantissa, and a switch for selectively exchanging a rounding action bit and least significant bit depending on the rounding mode. A zero detector determines whether the one rounding action bit (or the least significant bit if the rounding action bit and least significant bit are exchanged), and other rounding action bits of the mantissa indicate the mantissa should be incremented. A right justify unit aligns the mantissa. The mantissa is adjusted according to the rounding mode before an incrementer increments the mantissa from one of the rounding action bit positions in response to the zero detector. Mantissa select logic and a mantissa selector select the incremented or non-incremented version of the mantissa depending on the rounding mode.

These and other aspects of the present invention can be better understood by reviewing the following figures in light of the detailed description of the preferred embodiments.

BRIEF DESCRIPTION OF THE DRAWINGS

FIG. 3A is a flow diagram showing how the method of the present invention varies according to the selected rounding mode.

FIG. 4 is schematic diagram of a preferred embodiment of the invention.

FIG. 5A is a schematic diagram of an exemplary switch referred to in FIG. 4.

FIG. 5B is a truth table describing the behavior of the switch circuit of FIG. 5A.

DETAILED DESCRIPTION OF THE PREFERRED EMBODIMENT

Figures 1, 2:
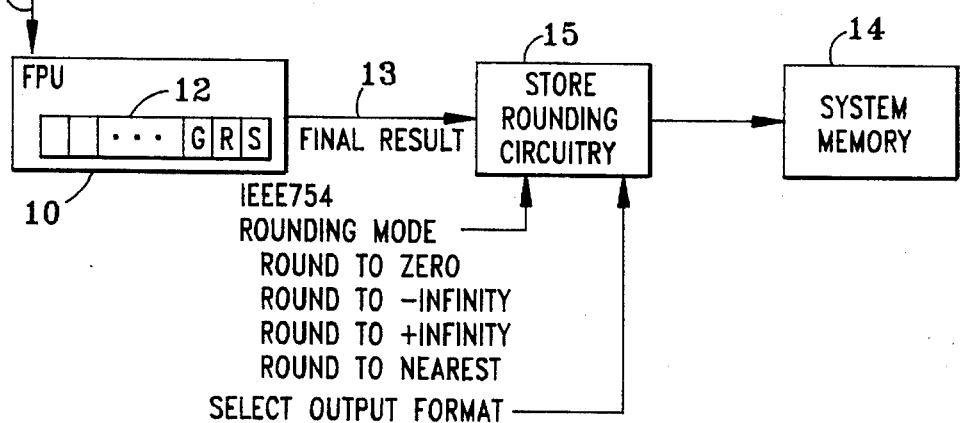
FIG. 1 shows rules for rounding for each of the four rounding modes addressed by the IEEE Standard 754.
FIG. 2 is block diagram schematically showing how the invention is configured within a computer system.

FIG. 2 is a block diagram of a computer system including store rounding circuitry according to the preferred embodiment of the present invention. The floating point unit (FPU) 10 provides the results of mathematical operations it performs upon mantissa operands 11 in one of several precision formats depending on the accuracy required by the user. Typically the FPU 10 uses a very high precision format such as extended real (64 bits) or an even higher precision internal format, but can also use lower precision formats. Intermediate results 12 are results, such as a partial product, to be used in further mathematical operations. Intermediate results 12 are rounded when the results of mathematical operations exceed the number of bits of the precision format employed by the FPU, but normally retain the precision of the FPU. When rounding intermediate results it is important to maintain the integrity of the guard (G), round (R) and sticky (S) bits used for rounding since they will be used in further calculations and rounding. Final results 13 are results which are to be immediately stored to memory 14 and are typically stored in a lower precision format (target precision format), which requires less space. When final results 13 are rounded in order to convert from the higher precision format of the FPU to the lower precision format of memory, the guard, round and sticky bits are not normally saved.

FIG. 1 shows rules for rounding for each of the four rounding modes addressed by the IEEE Standard 754. The rounding mode is normally selected by the application program. The columns labeled L, G, R and S respectively represent the states of the least significant bit, the guard bit, the round bit and the sticky bit, which for the purposes of describing the preferred embodiment of the present invention are collectively called rounding action bits. All possible combinations of the four bits are shown. The columns labeled "Round to Nearest", "Round to $+\infty$", "Round to $-\infty$" and "Round to Zero" represent the manner in which rounding is to be performed. In "Round to Zero" mode the number is truncated (no incrementing) regardless of the values of the LSB, G, R, and S bits.

In "Round to $+\infty$" and "Round to $-\infty$" modes the rounding rule depends not only on the LSB, G, R and S bits, but also on the sign bit, another rounding action bit. For a positive number, the sign bit is "0", and rounding is as follows. "Round to $-\infty$" requires truncation and "Round to $+\infty$" increments the LSB by one unless each of the G, R, and S bits are "0", in which case truncation is required. For a negative number, the sign bit is "1" and rounding is reversed.

In "Round to Nearest" mode, the number is truncated (no incrementing) when: a) the guard bit is "0" (cases 5–8 and 13–16 in FIG. 2); b) the guard bit is "1" at the same time the least significant bit, the round bit and the sticky bit are all "0" (case 12). Otherwise the least significant bit is incremented by ½ (cases 1–4 and 9–11).

Figures 3B, 3C:
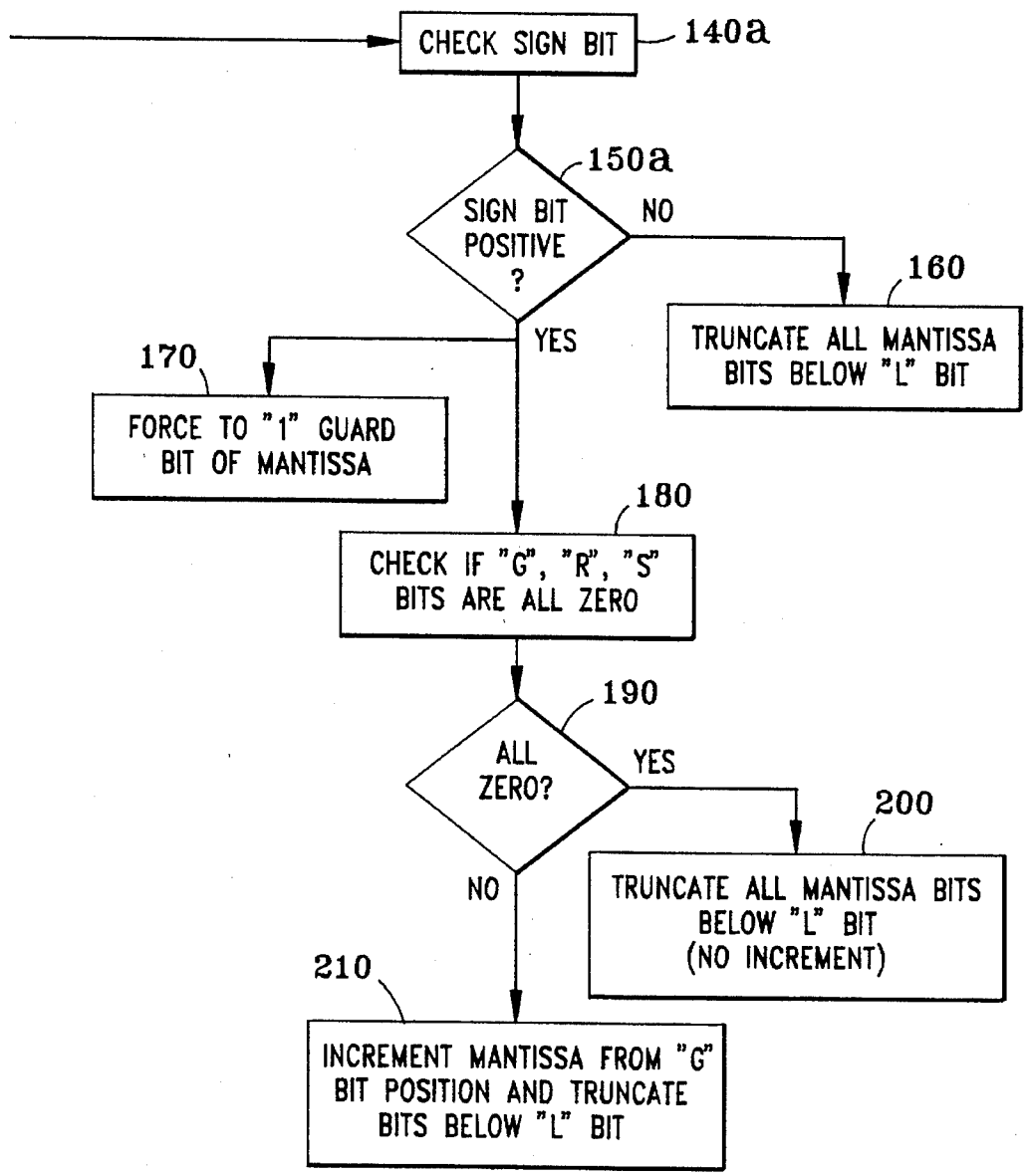
FIG. 3B is a flow diagram showing how the "Round to Zero" rounding mode is implemented in the method of the present invention.
FIG. 3C is a flow diagram showing how the "Round to Plus Infinity" rounding mode is implemented in the method of the present invention.

FIGS. 3A through 3E are flow diagrams for implementing the rounding rules of FIG. 1 in the method of the preferred embodiment of the present invention. With reference to FIG. 3A the first step 100 is to check the rounding mode. The remaining steps vary depending on the rounding mode as shown at block 110. FIG. 3B shows the single step 130 of truncating all bits below the mantissa least significant bit when the rounding mode is "Round to Zero".

Figure 3D:
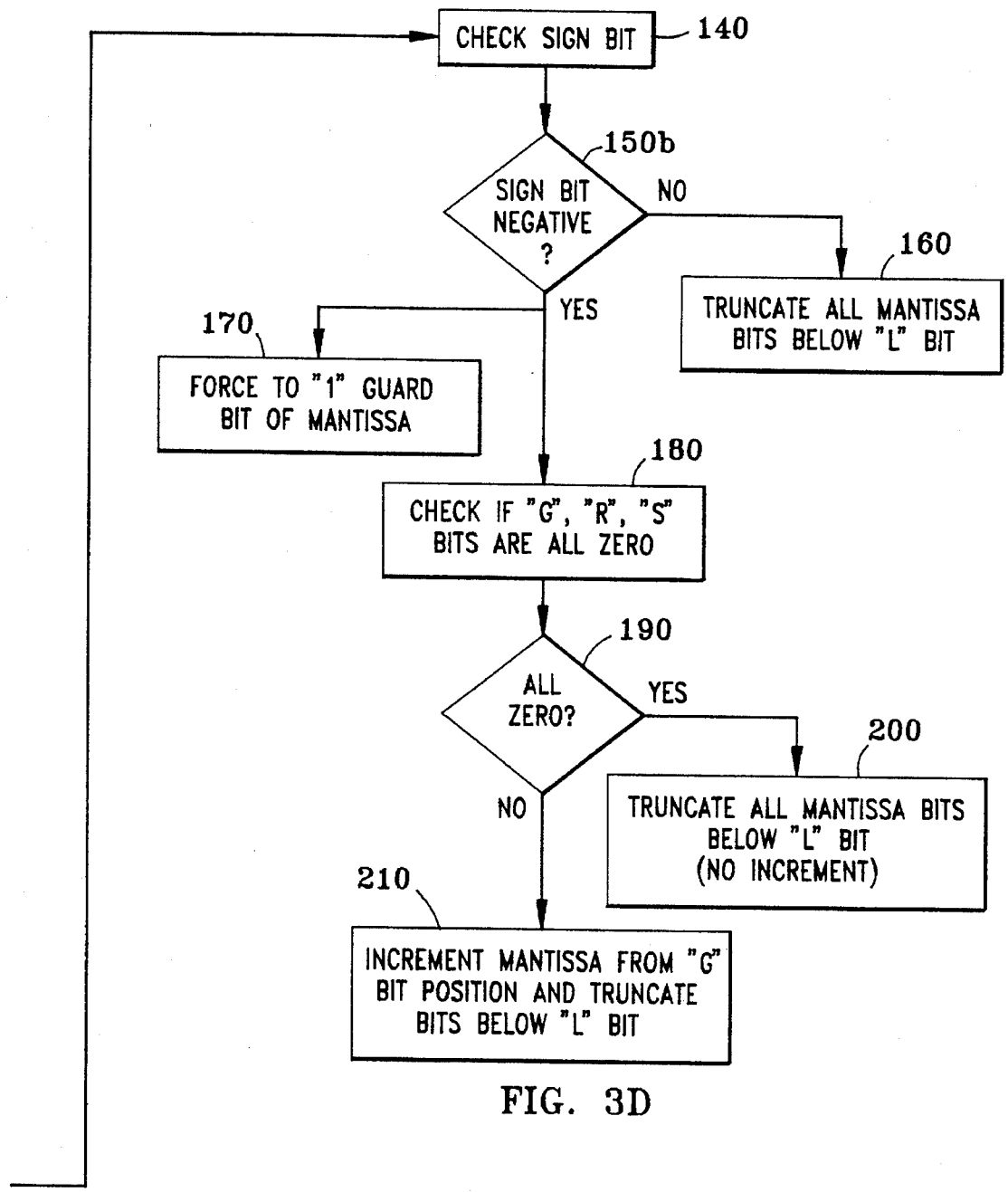
FIG. 3D is a flow diagram showing how the "Round to Minus Infinity" rounding mode is implemented in the method of the present invention.

The steps for rounding when the rounding mode is "Round to $+\infty$" or "Round to $-\infty$" are shown respectively in FIGS. 3C and 3D in which like steps share the same reference numerals. First, at block 140 the sign bit is examined to determine if the mantissa is negative or positive. The remaining steps are identical except that decision blocks 150a tests for a sign bit indicating a positive number, while 150b tests for a sign bit indicating a negative number.

With reference to FIG. 3C for "Round to $+\infty$", if the sign bit indicates the mantissa is negative (150a), the mantissa bits below the least significant bit are effectively truncated at block 160. If the sign bit indicates the mantissa is positive (150a), the flow splits into two parallel paths. A first path defined by block 170 forces to "1" the guard bit of the mantissa. A second path which starts at block 180 first checks if the guard, round and sticky bits are all zero. If the guard, round and sticky bits are not all zero, at block 210 the mantissa is incremented from the guard bit position and all bits below the least significant bit are truncated. By the time the incrementing occurs, the guard bit has already been forced to "1" by the parallel first path 170. If the guard, round and sticky bits are all zero, the mantissa is truncated at block 200 without first being incremented.

With reference to FIG. 3D for "Round to $-\infty$", if the sign bit indicates the mantissa is positive (150b), the mantissa bits below the least significant bit are effectively truncated at block 160. If the sign bit indicates the mantissa is negative (150b), the flow splits into the two parallel paths starting at blocks 170 and 180 and described in detail in the discussion of FIG. 3C above.

Figure 3E:
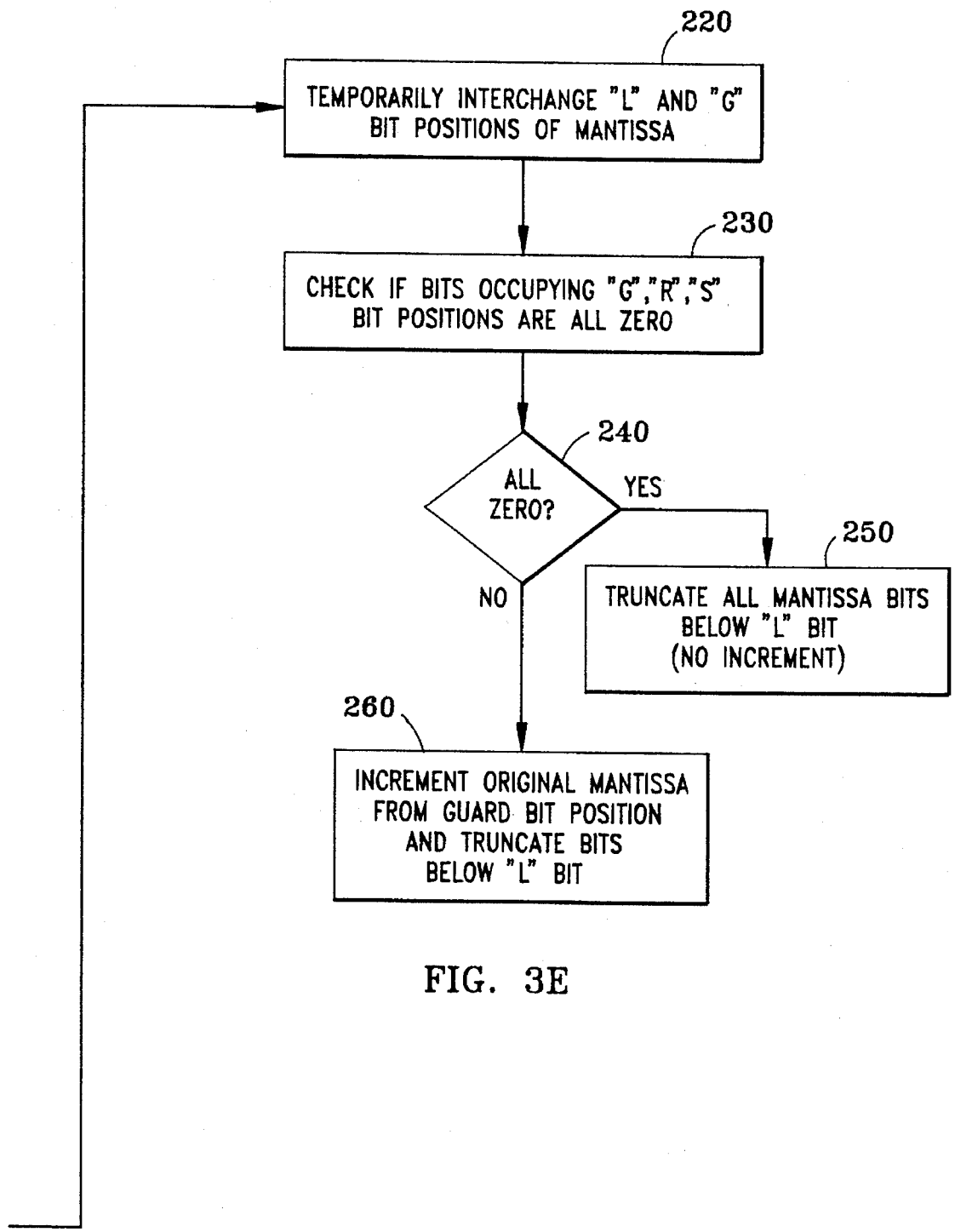
FIG. 3E is a flow diagram showing how the "Round to Nearest" rounding mode is implemented in the method of the present invention.

FIG. 3E shows the steps for the "Round to Nearest" rounding mode. First 220, the positions of the least significant bit and guard bit of the mantissa are exchanged. Next 230, the bits occupying the guard, round and sticky bit positions, as exchanged, are checked to determine if they are all zero. Next 260, if the guard, round and sticky bits, as exchanged, are not all zero, the original mantissa (no bits exchanged) is incremented from the guard bit position and all bits below the least significant bit are truncated. If the guard, round and sticky bits, as exchanged, are all zero, at step 250 the bits below the least significant bit of the original mantissa are truncated without first being incremented.

FIG. 4 is a schematic of a preferred embodiment rounding circuit of the present invention. For the sake of clarity the preferred embodiment is described primarily in terms of a circuit which rounds for only one target precision.

The mantissa is preferably held in an input register 20, but may also reside on a bus coming from the FPU. The register 20 width is selected according to the desired precision format of the FPU. Although register 20 of the preferred embodiment is 63 bits, the number of mantissa bits in extended real mode, the input register 20 can have more or fewer bits depending upon the precision of the FPU. Also shown for the sake of clarity are the positions for the least significant, guard, round and "sticky" bits according to the target precision. For example, when the mantissa is being converted from extended real precision format to single precision format the L, G, R and S bits appear respectively in positions 40, 39, 38 and 37. However, the invention can be used to convert to target precision formats other than single precision and the bit positions of the guard, round and sticky bits will vary accordingly.

Rounding mode control signals CR0 and CR1 are NOR'ed 34 to generate the rounding mode as shown in Table 1, below. The NOR gate 34 output "RTN" is "1" for the "Round to Nearest" rounding mode and "0" for all other rounding modes.

TABLE 1

| CR0 | CR1 | Rounding Mode | RTN |
|---|---|---|---|
| 0 | 0 | Round to Nearest | 1 |
| 0 | 1 | Round to −∞ | 0 |
| 1 | 0 | Round to +∞ | 0 |
| 1 | 1 | Round to Zero | 0 |

The input register 20 is coupled to a switch 22 for exchanging the least significant bit with the guard bit. If there is more than one target precision there will be a switch for each target precision. The switch, which is preferably a two-way multiplexer configured as shown in FIGS. 5A and 5B, has two inputs 24 and 26, two corresponding outputs 28 and 30, and a rounding mode control line 32 coupled to the output of a NOR gate 34. When the rounding mode control line indicates that the rounding mode is other than "Round to Nearest", the inputs 24 and 26 are passed directly to the corresponding outputs 28 and 30 (pass mode). When the rounding mode control line 32 indicates that the rounding mode is "Round to Nearest" mode, the inputs 24 and 26 are crossed-over to the opposite outputs 30 and 28 (swap mode).

Also coupled to the input register 20 and the switch 22 are the inputs of a zero detector 38. If there is more than one target precision the zero detector can be controlled by select lines to check the appropriate bit positions for the target precision. If the switch 22 is in pass mode, the zero detector 38 receives at the input 30 the guard bit of the mantissa. If the switch is in swap mode, the zero detector 38 receives at the input 30 the least significant bit of the mantissa. The zero detector also receives the round bit and may receive an explicit sticky bit. The sticky bit is considered explicit if it was previously calculated and included in the mantissa. The zero detector provides an output indicating whether all its inputs (i.e. the guard/lsb, round and sticky bits) are zero. Normally, the FPU does not provide an explicit sticky bit with a mantissa to be stored. If no explicit sticky bit is provided, it is preferably implicitly calculated during the zero detection step by providing the zero detector 38 not only the guard/lsb and round bits, but also all the bits below the round bit (not shown). If desired, the zero detector can be modified to aid in normalization of the mantissa. For example, the zero detector 38 can be provided with inputs (not shown) for every mantissa bit to determine if all inputs are zero, and can be provided with an additional output for indicating whether all inputs are zero.

Also coupled to the input register 20 is a right justify unit 48. The right justify unit 48 is preferably a multiplexer as wide as the mantissa which shifts the mantissa right until the mantissa guard bit of the target precision is in the rightmost position of the unit 48. Bits below the G bit are not kept by the right justify unit. For example in FIG. 4, since the mantissa is to be converted from double extended precision to single precision, the right justify unit 48 receives from the input register 20 bits 63-0. The right justify unit will position bit 39 (guard bit) in the rightmost position, bit 40 (LSB) in the next rightmost position and so forth; bits 38-0 are dropped. When the circuit is to handle more than one target precision, the number of bit positions shifted right will vary according to the selected target precision.

The right justify unit provides to an input of a guard bit selector 54 the guard bit of the mantissa. The guard bit selector 54, controlled by RTN and the inversion of RTN, selects between the guard bit and a second input to place at its output. In the preferred embodiment, the second input is fixed at Vcc, the power supply voltage, to provide a logical "1". The selection of the guard bit value permits the use of a simple incrementer for all rounding modes as will be seen more clearly below. Because the guard bit, along with the round and sticky bits, of the mantissa is discarded when stored to memory, the guard bit can be manipulated by the guard bit selector 54 without any loss of integrity to the resulting number.

An incrementer 42 is coupled to the right justify unit 48, the guard bit selector 54 and the zero detector 38. The incrementer 42 is one bit wider than the target precision (or, alternatively, one bit wider than the highest target precision if more than one precision is to be handled by the circuit).

The incrementer 42 receives from the right justify unit at a plurality of mantissa inputs 45 the mantissa appropriately aligned for the target precision. For example, if the target precision is single precision, bits 63-40 of the original mantissa are received in bit positions 23-1 of incrementer 42. The incrementer 42 receives the output of the guard bit selector 54 at a preset input 46.

The carry-in increment input 40 of the incrementer 42 is in the guard bit position 44 and is coupled to the output of the zero detector 38. When the zero detector 38 indicates that its inputs are not all zero, the carry-in increment input 40 causes the incrementer 42 to ripple the carry from right to left. When the zero detector 38 indicates that all its inputs are zero, the carry-in increment input 40 does not trigger an increment. When the guard bit selector 54 presets the guard bit of the incrementer to "1", and the carry-in increment propagates a carry, the mantissa is effectively incremented from the least significant bit position. Thus by presetting the guard bit, a very simple incrementer can be used to increment from both the guard bit or the least significant bit positions.

The right justify unit 48 and the incrementer 42 provide to a mantissa selector 50 unrounded 56 and rounded 58 mantissa inputs. Mantissa select logic 60 is coupled to the select line of mantissa selector 62. Mantissa select logic 60 receives at its inputs control bits CR0 and CR1 and the mantissa sign bit and decides whether the rounding mode requires the unrounded or rounded result according to Table 2 below. The mantissa selector 50 and mantissa select logic 60 provide a fast by-pass means when the rounding mode does not require the mantissa to be incremented.

TABLE 2

| CR0 | CR1 | SIGN | RESULT SELECTED |
|---|---|---|---|
| 0 | 0 | X | rounded |
| 0 | 1 | 0 | unrounded |
| 0 | 1 | 1 | rounded |
| 1 | 0 | 0 | rounded |
| 1 | 0 | 1 | unrounded |
| 1 | 1 | X | unrounded |

X — don't care

In operation, the rounding circuit described above implements the steps shown in FIGS. 3A through 3E for the "Round to Zero", "Round to Plus Infinity", "Round to Minus Infinity" and "Round to Nearest" rounding modes. The operation of the circuit for each of those modes will now be described.

In "Round to Zero" mode the mantissa is aligned by the right justify unit and is passed to the unrounded input 56 of the mantissa selector, bypassing the incrementer 42. The mantissa selector 50 selects the unrounded input 56. While the zero detector 38 is still enabled and may provide an increment signal to the carry-in increment input 40 of the incrementer 42, the incrementer output 58 is ignored.

When the rounding mode is "Round to ±∞" (CR0=1/0, CR1=0/1) the rounding action depends additionally upon the sign bit as shown in FIG. 1. The circuit performs two rounding actions (increment or no increment) in parallel paths and decides at the end of the paths via the mantissa select logic 60 and the mantissa selector 50 which value is the appropriate value.

When the rounding mode is "Round to +∞" and the sign bit is negative or when the rounding mode is "Round to −∞" and the sign bit is positive no increment is required. For these cases the operation of the circuit is similar to that for the "Round to Zero" case. The mantissa select logic and the mantissa selector select the unrounded result 56, while the output 58 of the incrementer 42 is ignored.

When the rounding mode is "Round to +∞" and the sign bit is positive or when the rounding mode is "Round to −∞" and the sign bit is negative, an increment will be required for all cases shown in FIG. 1 except cases 8 and 16. Under these circumstances, the mantissa select logic and the mantissa selector 50 select the rounded input 58 of the mantissa selector 50. Rounding is performed as follows. When RTN (output of NOR gate 34) is low, indicating the rounding mode is other than "Round to Nearest", the switch 22 is in pass mode, such that the actual G, R, and S bits (or all bits below round bit when sticky bit is implicit) are input to the zero detector 38. RTN=0 also selects the second input of the guard bit selector 54, which is fixed at a logical "1" in the preferred embodiment, to preset the guard bit position 44 of the incrementer 42. If the zero detector 38 indicates the presence of non-zero inputs, the carry-in increment 40 causes the incrementer 42 to increment from the guard bit position 44. Since the guard bit position 44 was previously preset to a "1", this is effectively the same as rounding up by one from the least significant bit position as is required by the IEEE Standard 754. If the zero detector 38 indicates that all its inputs are zeroes, consistent with cases 8 and 16, the carry-in increment 40 does not cause the incrementer 42 to increment. Even though the guard bit 44 was previously preset to one, the mantissa is effectively truncated since the guard bit is dropped by the mantissa selector 50.

When the rounding mode is "Round to Nearest", the rounding rules shown in FIG. 1 require the mantissa to be truncated or incremented by ½ the least significant bit depending on the values of the least significant, guard, round and sticky bits. When RTN (output of NOR gate 34) is high, indicating the "Round to Nearest" rounding mode, the switch 22 is in swap mode and exchanges the least significant bit with the guard bit such that the zero detector 38 receives the least significant bit, the round bit and the sticky bit (or all the bits below the round bit when sticky bit is implicit). RTN=1 also selects the first input of the guard bit selector 54, which is the true guard bit in the preferred embodiment, to preset the guard bit position 44 of the incrementer 42. If the least significant, round and guard bits are all zero no increment occurs, consistent with cases 12 and 16 in FIG. 1. In cases 5–8 and 13–15, the zero detector 38 increments the guard bit 44 of the incrementer 42, but since in these cases the guard bit 44 is equal to zero, the mantissa is effectively truncated as required by the IEEE Standard 754. In the cases 1–4 and 9–11 the zero detector 38 causes the incrementer to increment from the guard bit position 44, which is how an increment of ½ the least significant bit is normally achieved.

Thus rounding according to the present invention is simpler and faster than the prior art. The swapping of the guard bit and least significant bit simplifies zero detection and the decision whether or not to increment. The alteration of the guard bit by the guard bit selector handles special cases and allows for a simple incrementer which needs only increment from one position. Since no further mathematical operations are contemplated just prior to a store to memory, there is no need to preserve the original values of these bits. The mantissa selector provides a means to bypass zero detection when zero detection is not required to determine rounding action, for even faster handling of simple cases.

The invention has been described with reference to a specific preferred embodiment. However, the invention is not limited to these particulars. In view of the foregoing disclosure other embodiments will be apparent to those of ordinary skill in the art, including modifications to the rounding circuit for handling multiple target precisions. It is therefore not intended that the claims include all modifications and variations that fall within the spirit and scope of the invention.

What is claimed is:

1. A method for floating point rounding of a mantissa for converting the mantissa from a first precision format to a second precision format, the second precision format being lower than the first precision format, the method comprising the steps of:

selecting a rounding mode from a plurality of rounding modes;

identifying a plurality of rounding action bits of the mantissa according to the lower precision format;

forming from the original mantissa a modified mantissa by selectively exchanging one of the rounding action bits with a least significant bit of the mantissa according to the selected rounding mode;

forming from the original mantissa a preset mantissa by selectively forcing the one rounding action bit to a "1" according to the selected rounding mode;

determining if the rounding action bits are zero in one of the modified mantissa or the original mantissa;

if the determined rounding action bits are not equal to zero, selectively incrementing from a rounding action bit position in one of the original mantissa or the preset mantissa, forming an incremented mantissa; and truncating one of the incremented mantissa or the original mantissa below the least significant bit according to the second precision format.

2. The method of claim 1 wherein one of the rounding modes is "Round to Nearest", the rounding action bits include a guard bit, and the step of forming a modified mantissa results in the exchange of the guard bit with the least significant bit when the selected rounding mode is "Round to Nearest".

3. The method of claim 1 wherein the rounding action bits include a guard bit and a sign bit, one of the rounding modes is "Round to +∞", and the step of forming a preset mantissa results in forcing to "1" the guard bit of the mantissa when the selected rounding mode is "Round to +∞" and the sign bit indicates a positive number.

4. The method of claim 1 wherein the rounding action bits include a guard bit and a sign bit, one of the rounding modes is "Round to −∞", and the step of forming a preset mantissa results in forcing to "1" the guard bit of the mantissa when the selected rounding mode is "Round to −∞" and the sign bit indicates a negative number.

5. The method of claim 1 wherein one of the rounding modes is "Round to Nearest", the zero determining step is performed on the original mantissa if the selected rounding mode is other than "Round to Nearest", and the zero determining step is performed on the modified mantissa if the selected rounding mode is "Round to Nearest".

6. The method of claim 1 wherein one of the rounding modes is "Round to Nearest" and the incrementing step results in incrementing the original mantissa if the rounding action bits of the modified mantissa are not equal to zero while the selected rounding mode is "Round to Nearest".

7. The method of claim 1 wherein the rounding action bits include a sign bit, one of the rounding modes is "Round to +∞" and the incrementing step results in incrementing the preset mantissa if the rounding action bits of the original mantissa are not equal to zero while the selected rounding mode is "Round to +∞" and the sign bit indicates a positive number.

8. The method of claim 1 wherein the rounding action bits include a sign bit, one of the rounding modes is "Round to −∞" and the incrementing step results in incrementing the preset mantissa if the rounding action bits of the original mantissa are not equal to zero while the selected rounding mode is "Round to −∞" and the sign bit indicates a negative number.

9. A method for floating point rounding of a mantissa for converting the mantissa from a first precision format to a second precision format, the second precision format being lower than the first precision format, the method comprising the steps of:

selecting a rounding mode from the group comprising "Round to Nearest", "Round to +∞" and "Round to −∞";

identifying a plurality of rounding action bits of the mantissa according to the lower precision format, the rounding action bits comprising a guard bit, a round bit, at least one sticky bit and a sign bit;

if the rounding mode is "Round to Nearest":
 forming from the original mantissa a modified mantissa by exchanging the guard bit with the least significant bit of the mantissa;
 determining if the rounding action bits of the modified mantissa are zero;
 if the determined rounding action bits are not equal to zero, incrementing from the guard bit position of the original mantissa, forming an incremented mantissa;

if the rounding mode is "Round to +∞" and the sign bit indicates a positive number:
 forming from the original mantissa a preset mantissa by selectively forcing the guard bit to a "1";
 determining if the rounding action bits of the original mantissa are zero;
 if the sign bit indicates a positive number, and the determined rounding action bits are not equal to zero, incrementing from the guard bit position of the preset mantissa, forming an incremented mantissa;

if the rounding mode is "Round to −∞" and the sign bit indicates a negative number:
 forming from the original mantissa a preset mantissa by selectively forcing the guard bit to a "1";
 determining if the rounding action bits of the original mantissa are zero;
 if the sign bit indicates a negative number, and the determined rounding action bits are not equal to zero, incrementing from the guard bit position of the preset mantissa, forming an incremented mantissa; and truncating one of the incremented mantissa or the original mantissa below the least significant bit according to the second precision.

10. A method of rounding a mantissa according to the "Round to Nearest" mode for converting from a higher precision format to a lower precision format, the method comprising the steps of:

identifying, a least significant bit, a round bit, a guard bit and at least one sticky bit of the mantissa based on the lower precision format;

forming from the original mantissa a modified mantissa by exchanging the guard bit with the least significant bit of the mantissa;

determining if the bits occupying the guard bit, round bit and sticky bit positions of the modified mantissa are all zero;

incrementing from the guard bit position the original mantissa if not all of the bits occupying the guard bit, round bit and sticky bit positions of the modified mantissa are zero, forming an incremented mantissa; and truncating one of the incremented mantissa or the original mantissa below the least significant bit according to the lower precision format.

11. A method of rounding a mantissa according to the "Round to +∞" mode for converting from a higher precision format to a lower precision format, the method comprising the steps of:

identifying a least significant bit, a round bit, a guard bit at least one sticky bit and a sign bit of the mantissa based on the lower precision format;

forming from the original mantissa a preset mantissa by forcing to "1" the guard bit of the mantissa if the sign bit indicates a positive number;

determining if the bits occupying the guard bit, round bit and sticky bit positions of the original mantissa are all zero;

incrementing from the guard bit position the preset mantissa if not all of the bits occupying the guard bit, round bit and sticky bit positions of the original mantissa are zero, forming an incremented mantissa; and truncating one of the incremented or the original mantissa below the least significant bit according to the lower precision format.

12. A rounding circuit for converting a mantissa from a higher precision format to a lower precision format comprising:

input storage means for receiving the mantissa, the mantissa having a plurality of rounding action bits and a sign bit;

a mode selector for selecting a rounding mode;

a means for aligning the mantissa;

a bit exchanger coupled to the mode selector and the input storage means for receiving and selectively exchanging one of the rounding action bits with the least significant bit according to the selected rounding mode;

a zero detector coupled to the input storage means and the bit exchanger for receiving the others of the rounding action bits of the mantissa and for receiving one of the least significant bit or the one rounding action bit of the mantissa and for providing an output indicating if all the bits received are zero;

a guard bit selector for selecting, according to the rounding mode, one of a plurality of predetermined inputs and for providing a preset output;

an incrementer having a mantissa portion and a guard bit portion, the mantissa portion coupled to the input storage means for receiving the mantissa, the guard bit portion having a first input coupled to the preset output of the guard bit selector and a second carry-in increment input coupled to the output of the zero detector for incrementing the mantissa in response to the zero detector output;

mantissa select logic for determining whether the incremented output is appropriate according to the selected rounding mode; and a mantissa selector having a first input coupled to the input storage means for receiving a non-incremented mantissa and a second input coupled to the incrementer output for receiving an incremented mantissa, the mantissa selector for selecting the first input or the second input responsive to the mantissa select logic.

13. The circuit of claim 12, wherein: the rounding mode is selected from the group comprising: "Round to +∞", "Round to −∞", "Round to Zero" and "Round to Nearest".

14. The circuit of claim 13 wherein: the bit exchanger exchanges the least significant bit and the guard bit only when the selected rounding mode is "Round to Nearest".

* * * * *